(12) United States Patent
Ajioka et al.

(10) Patent No.: US 9,093,872 B2
(45) Date of Patent: Jul. 28, 2015

(54) SEAL OIL FEEDING APPARATUS OF ROTATING ELECTRICAL MACHINE

(75) Inventors: Hideyasu Ajioka, Tokyo (JP); Takaharu Tani, Yokohama (JP); Naoshi Murakami, Yokohama (JP); Shohei Soma, Yokohama (JP); Toshihiro Mouri, Yokohama (JP); Mitsuyoshi Kuramoto, Yokohama (JP)

(73) Assignee: Kabushiki Kaisha Toshiba (JP)

( * ) Notice: Subject to any disclaimer, the term of this patent is extended or adjusted under 35 U.S.C. 154(b) by 779 days.

(21) Appl. No.: 13/240,093

(22) Filed: Sep. 22, 2011

(65) Prior Publication Data

US 2012/0098206 A1   Apr. 26, 2012

(30) Foreign Application Priority Data

Oct. 22, 2010  (JP) ................................. 2010-237449

(51) Int. Cl.
| | |
|---|---|
| *H02K 5/12* | (2006.01) |
| *H02K 5/124* | (2006.01) |
| *H02K 9/19* | (2006.01) |
| *H02K 9/20* | (2006.01) |

(52) U.S. Cl.
CPC .................. *H02K 5/124* (2013.01); *H02K 9/19* (2013.01); *H02K 9/20* (2013.01)

(58) Field of Classification Search
CPC ............ H02K 9/20; H02K 5/124; H02K 9/19
USPC .......................................................... 96/193
See application file for complete search history.

(56) References Cited

U.S. PATENT DOCUMENTS

| | | | | |
|---|---|---|---|---|
| 2,453,217 A | * | 11/1948 | Gregg et al. ................. | 184/6.13 |
| 2,608,380 A | * | 8/1952 | Rice .............................. | 415/175 |
| 3,795,460 A | * | 3/1974 | Endo et al. .................... | 415/175 |
| 4,792,911 A | * | 12/1988 | Gonzalez et al. ............ | 702/185 |
| 4,969,796 A | * | 11/1990 | Wescott et al. ............... | 415/110 |
| 5,147,015 A | * | 9/1992 | Snuttjer et al. ............... | 184/6.22 |

(Continued)

FOREIGN PATENT DOCUMENTS

| | | |
|---|---|---|
| EP | 2 079 151 A1 | 7/2009 |
| EP | 2 189 688 A1 | 5/2010 |

(Continued)

OTHER PUBLICATIONS

Schubert EP 2 079 151 A1 as translated by Google.*

(Continued)

*Primary Examiner* — Duane Smith
*Assistant Examiner* — Stephen Hobson
(74) *Attorney, Agent, or Firm* — Harness, Dickey & Pierce, P.L.C.

(57) ABSTRACT

According to one embodiment, a seal oil feeding apparatus includes a hydrogen detraining tank, a float trap tank, and an air detraining tank. The hydrogen detraining tank is configured to collect and reserve seal oil that has flowed out to the inside of a housing from a sealing unit. The float trap tank is provided integrated with the hydrogen detraining tank in horizontally, and is connected to the hydrogen detraining tank, so that the liquid level of the seal oil becomes substantially the same as the height of the hydrogen detraining tank. The float trap tank includes a float valve. The air detraining tank is placed at a position lower than the hydrogen detraining tank and float trap tank, and reserves seal oil that has flowed out from the float valve.

4 Claims, 3 Drawing Sheets

(56) References Cited

U.S. PATENT DOCUMENTS

| | | | |
|---|---|---|---|
| 2010/0189545 A1* | 7/2010 | Annigeri et al. | 415/110 |
| 2011/0231111 A1* | 9/2011 | Andritz et al. | 702/34 |
| 2015/0013540 A1* | 1/2015 | Okumura et al. | 95/266 |

FOREIGN PATENT DOCUMENTS

| | | | | |
|---|---|---|---|---|
| EP | 2079151 B1 * | 7/2010 | | |
| JP | 52-069994 | 6/1977 | | |
| JP | 57030509 A * | 2/1982 | | B01D 19/00 |
| JP | 61-52472 | 3/1986 | | |
| JP | 03-155350 | 7/1991 | | |
| JP | 11-341745 | 12/1999 | | |
| JP | 2004-007876 | 1/2004 | | |
| JP | 2008-172939 | 7/2008 | | |
| JP | 2009-142124 | 6/2009 | | |

OTHER PUBLICATIONS

Makihara et al. JP 57030509 as translated by FLS, Inc.*
Extended European Search Report dated Feb. 7, 2012 (7 pages).
Japanese Office Action for Application No. 2010-237449 dated Jul. 22, 2014 with English translation (4 pages).

* cited by examiner

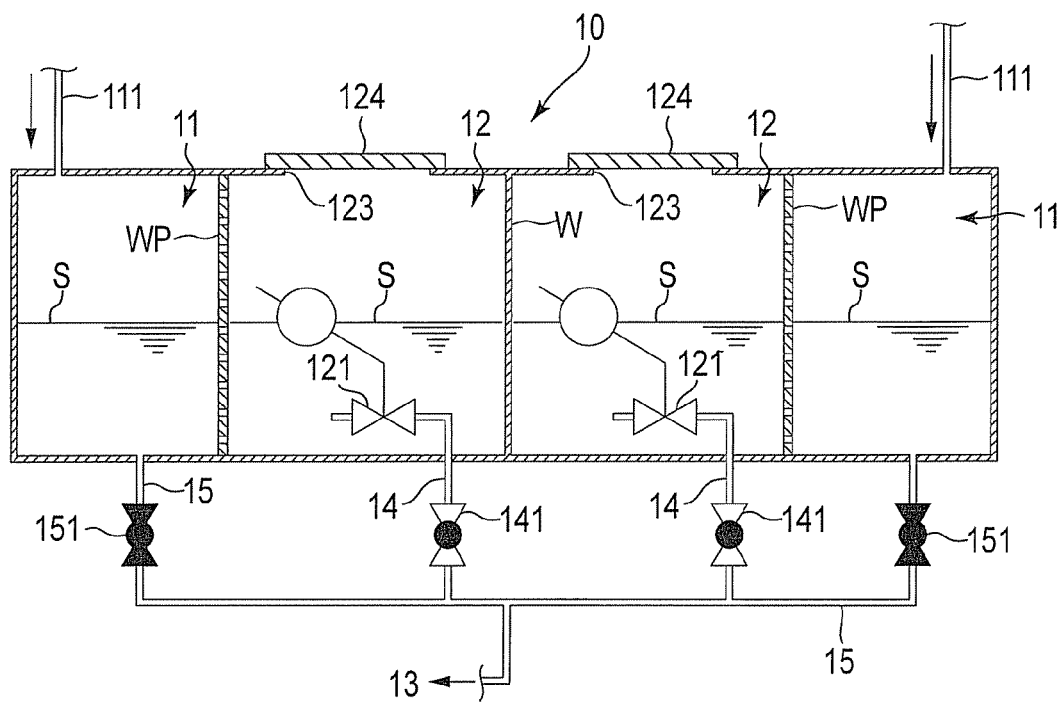
F I G. 4
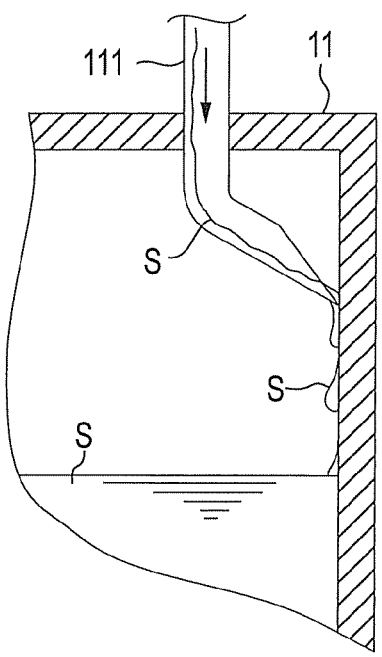
F I G. 5

SEAL OIL FEEDING APPARATUS OF ROTATING ELECTRICAL MACHINE

CROSS-REFERENCE TO RELATED APPLICATIONS

This application is based upon and claims the benefit of priority from prior Japanese Patent Application No. 2010-237449, filed Oct. 22, 2010, the entire contents of which are incorporated herein by reference.

FIELD

Embodiments described herein relate generally to a seal oil feeding apparatus for sealing a cooling medium to cool a rotating electrical machine inside the machine.

BACKGROUND

A rotating electrical machine such as a turbine generator using hydrogen gas as a cooling medium for cooling a coil and a structure inside a machine is provided with a sealing unit between a rotor shaft and a housing. The sealing unit seals hydrogen gas inside a housing or a rotating electrical machine with seal oil fed at a pressure higher than a pressure inside the housing. Seal oil is fed from a seal oil feeding apparatus to the sealing unit so as to always flow out from the sealing unit to the inside and outside of the housing. The seal oil feeding apparatus collects seal oil flowed out to the inside and outside of the housing, and feeds the oil back to the sealing unit.

Hydrogen gas mixes in seal oil flowed to the inside of the housing. The seal oil feeding apparatus is provided with a hydrogen detraining tank, a float trap tank, and an air detraining tank, as a separation unit for eliminating hydrogen gas. Seal oil flowed out to the inside of the housing is fed to the hydrogen detraining tank where most hydrogen bubbles are eliminated. Then, the seal oil is sent to the float trap tank. The float trap tank is provided with a float valve, which ejects seal oil to the air detraining tank when the liquid level of reserved seal oil exceeds a certain level.

The area from the sealing unit to the float value is kept at the same pressure as the inside of the housing, and the air detraining tank is opened to atmospheric pressure. The hydrogen detraining tank is placed at a position higher than the float trap tank so as to send out seal oil to the float trap tank. The hydrogen detraining tank is placed at a position higher than the air detraining tank so that seal oil flows out from the hydrogen detraining tank to the air detraining tank even if the internal pressure of the housing is lowered to atmospheric pressure.

The float trap tank is desirably placed at a height between the heights of the hydrogen detraining tank and the air detraining tank for flowing seal oil to the air detraining tank even if the inside of the housing is close to atmospheric pressure. However, a building should have sufficient height and installation space to have a sufficient height difference between the liquid levels of the tanks so that seal oil flows between the tanks. Since a pressure in the float trap tank becomes the same as an inside pressure of the housing, and seal oil can be flowed to the air detraining tank even if the float trap tank is placed at a position lower than the air detraining tank. Therefore, if the sufficient height difference is not provided within the building, the hydrogen detraining tank is merely placed at a position a little higher than the air detraining tank, and the float trap tank is placed at a position lower than the air detraining tank.

However, if the position of the float trap tank is lower than the air detraining tank, seal oil may flow backward from the air detraining tank when the pressure inside the housing of the rotating electrical machine decreases close to atmospheric pressure, and the float valve opens. The float valve closes only when the liquid level decreases. Therefore, the liquid level is difficult to confirm when the float flap tank is filled with seal oil. Hence, the liquid level of seal oil is unknown until seal oil overflows the hydrogen detraining tank and flows into the interior of the rotating electrical machine.

BRIEF DESCRIPTION OF THE DRAWINGS

FIG. 4 is a schematic cross section of a seal oil feeding apparatus of a fourth embodiment; and FIG. 5 is a cross section of the seal oil feeding apparatus show in FIG. 4 with an end of inside piping magnified.

DETAILED DESCRIPTION

In general, according to one embodiment, an embodiment provides a seal oil feeding apparatus, which smoothly circulates seal oil without an additional power source by simplifying a configuration maintaining functions, and a rotating electrical machine including the seal oil feeding apparatus.

According to an aspect of embodiments, a seal oil feeding apparatus includes a hydrogen detraining tank, a float trap tank, and an air detraining tank. The hydrogen detraining tank is configured to collect and reserve seal oil that has flowed out to the inside of a housing from a sealing unit which is configured to seal between a shaft extending from both ends of a rotor and a housing covering the rotor by flowing seal oil. The float trap tank is provided integrated with the hydrogen detraining tank in horizontally, and is connected to the hydrogen detraining tank, so that the liquid level of the seal oil becomes substantially the same as the height of the hydrogen detraining tank. The float trap tank includes a float valve which is opened to discharge the seal oil when the liquid level of the seal oil reserved inside exceeds a predetermined height. The air detraining tank is placed at a position lower than the hydrogen detraining tank and float trap tank, and is configured to reserve seal oil that has flowed out from the float valve.

Figure 1:
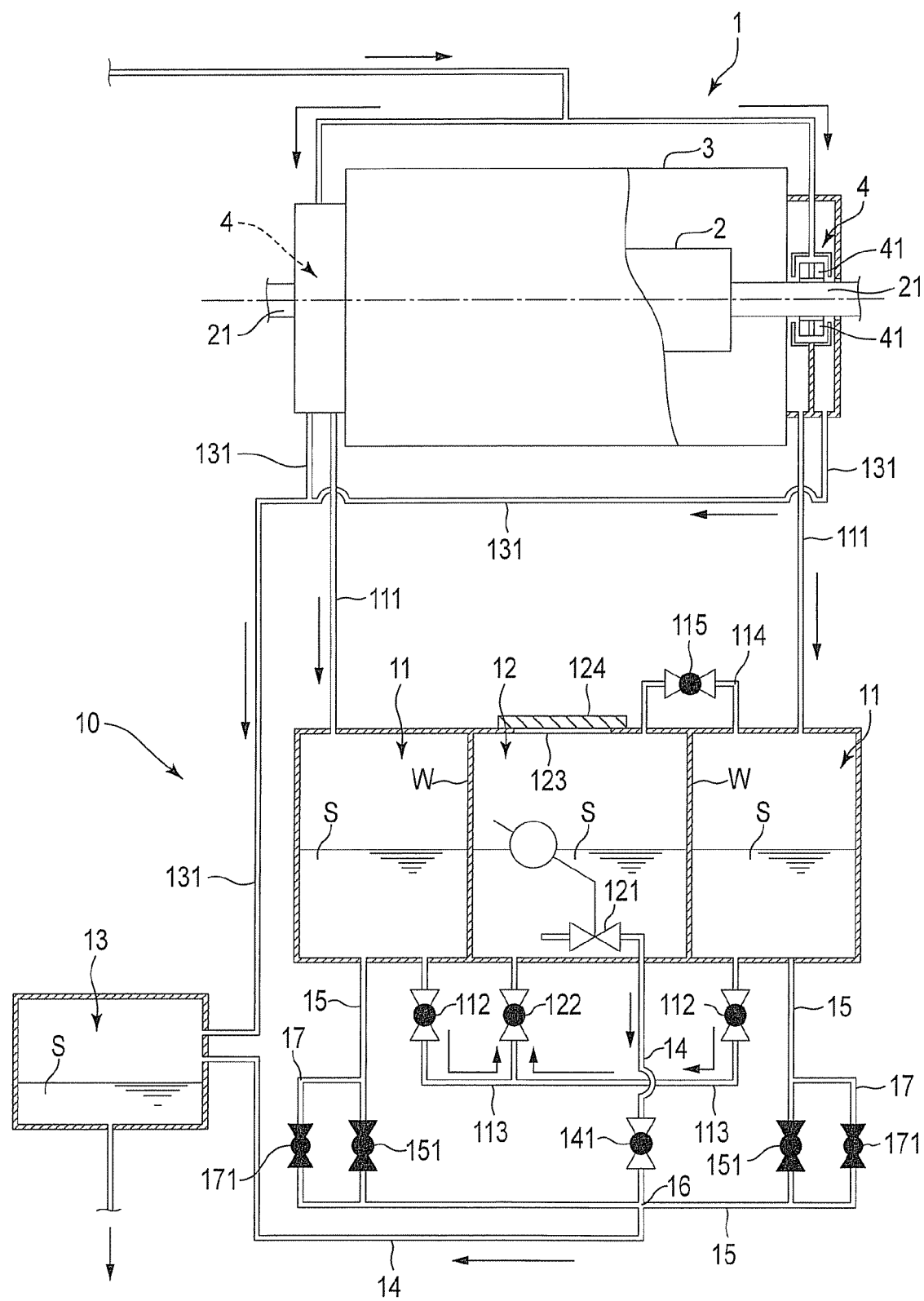
FIG. 1 is a schematic cross section of a rotating electrical machine provided with a seal oil feeding apparatus of a first embodiment.

A rotating electrical machine 1 provided with a seal oil feeding apparatus 10 of a first embodiment is explained with reference to FIG. 1. The rotating electrical machine 1 comprises a rotor 2, a housing 3, a sealing unit 4, and a seal oil feeding apparatus 10. The housing 3 constitutes an outer casing to cover the rotor 2 and a stator provided on the outer periphery of the rotor. The rotating electrical machine 1 uses hydrogen gas G as a cooling medium for cooling coils, of the rotor 2 and stator and other structures provided inside the housing 3. The sealing unit 4 is placed between the housing 3 and a shaft 21 extending from both ends of the rotor 2, and fills hydrogen gas G in the housing.

The sealing unit 4 includes a seal ring 41 fitted to the shaft 21. The seal oil feeding apparatus 10 feeds seal oil S to clearance between the shaft 21 and seal ring 41 at pressure higher than hydrogen gas G, and prevents hydrogen gas G from flowing out of the housing 3. Seal oil S fed to the clearance between the shaft 21 and seal ring 41 flows out to the inside and outside of the sealing unit 4. Hereinafter, the inside of the housing 3 kept at pressure higher than atmospheric pressure by the sealing unit 4 may be called "an internal side", and the side opened to atmospheric pressure may be called "an external side". The seal oil feeding apparatus 10 collects seal oil S flowed out from the sealing unit 4, and feeds back to the sealing unit 4. Bubbles of hydrogen gas G mix into seal oil S just flowed out from the sealing unit 4 to the internal side.

The seal oil feeding apparatus 10 includes at least a hydrogen detraining tank 11, a float trap tank 12, and an air detraining tank 13, as a separation unit for eliminating a bubble of hydrogen gas G from seal oil S. The hydrogen detraining tank 11 is provided in a pair corresponding to a pair of sealing units 4 provided at both ends of the rotor 2. Each hydrogen detraining tank 11 collects seal oil S flowed out from a corresponding sealing unit 4 to the inside of the housing 3 through an inside piping 111, and temporarily reserves the seal oil. Hydrogen bubbles mixed into the seal oil S rise and are almost eliminated, while the seal oil is being temporarily reserved.

The float trap tank 12 is formed integrated with a pair of hydrogen detraining tanks 11 horizontally, and is provided with a float valve 121. The float trap tank 12 is placed next to the hydrogen detraining tanks 11 in the first embodiment. There is no need the float trap tank is placed between the hydrogen detraining tanks. Therefore, hydrogen detraining tanks 11 and the float trap tank 12 are constructed as one multifunction tank separated into three rooms by partition walls W. In the embodiment, the float trap tank 12 and hydrogen detraining tanks 11 formed in one body can be one elongate cylindrical tank divided into three compartments by partition walls W. The float valve 121 is opened to eject seal oil S, when the liquid level of seal oil S reserved inside exceeds a predetermined height. Therefore, the area from the sealing unit 4 to the float valve 121 is kept at the same pressure as the internal side.

The hydrogen detraining tanks 11 and float trap tank 12 are provide with communicating valves 112 and 122 respectively in the part lower than the liquid level of seal oil S, and are connected through an oil piping 113. One of the hydrogen detraining tanks 11 is connected to the float trap tank 12 through a vent pipe 114 provided in the part higher than the liquid level of seal oil S. the float trap tank 12 is connected to the hydrogen detraining tank 11 on the right side through the vent pipe 114, as shown in FIG. 1 in the first embodiment. A vent valve 115 is provided in the middle of the vent pipe 114 to prevent hydrogen gas G from flowing out from the hydrogen detraining tank 11 connected through the vent pipe 114 when a hatch 124 of a manhole 123 is opened to check the float trap tank 12. The vent valve 115 is always opened while the rotating electrical machine 1 is being normally operated.

As the float trap tank 12 is connected to two hydrogen detraining tanks 11 as described above, the liquid levels of seal oil S become substantially the same in two hydrogen detraining tanks 11. The oil piping 113 is U-shaped to prevent gas in the hydrogen detraining tank 11 from cyclically flowing into the rotating electrical machine 1, even if the internal pressure of hydrogen detraining tanks 11 becomes different. The U-shaped piping mentioned here means piping that connects objects having a portion placed vertically below objects such as the float trap tank 12 and hydrogen detraining tanks 11 in this case, or piping to connect portions of the bottom of objects. In other words, the U-shaped piping means piping or connection to permit only liquid, seal oil S, to flow without flowing gas. The U-shaped piping makes a difference of the pressures between gases which are contained in each rooms above the liquid levels of objects communicated by the U-shaped piping, when the rooms for gases are not communicated each other.

Further, in the first embodiment, as the seal oil S reserved in the hydrogen detraining tank 11 can be ejected to the downstream without passing through the float trap tank 12, the mid portion of an outlet piping 14 extending from the float valve 121 is connected to the bottom of the hydrogen detraining tank 11 through a bypass piping 15. The outlet piping 14 is provided with a seal valve 141 in the upstream of a joint part 16 joining with the bypass piping 15. The bypass piping 15 is provided with a bypass valve 151 in a mid point to control the flow rate of seal oil S.

Further, the bypass piping 15 is provided with a sub-bypass piping 17 connecting the upstream and downstream of the bypass valve 151, just diverting from the bypass valve 151. The sub-bypass piping 17 is provided with a sub-bypass value 171 to control the flow rate of seal oil S more minutely than the bypass valve 151. The seal valve 141 is always opened, and the bypass valve 151 and sub-bypass valve 171 are always closed, when the rotating electrical machine 1 is normally operated.

The air detraining tank 13 is placed at a position lower than the hydrogen detraining tank 11 and float trap tank 12. The air detraining tank 13 is connected to the outlet piping 14 to reserve seal oil S flowed out from the float valve 121, and collects seal oil S through an outside piping 131 to reserve seal oil S flowed out from the sealing unit 4 to the external side. The air detraining tank 13 is opened to atmospheric pressure.

When the rotating electrical machine 1 configured as described above is normally operated, seal oil S is fed to the sealing unit 4 by the seal oil feeding apparatus 10. The seal oil S flowed out to the internal side is eliminated almost all hydrogen bubbles while being reserved in the hydrogen detraining tank 11, and then the seal oil S is sent to the float trap tank 12. Since the seal oil S is reserved in the float trap tank 12 until the float value 121 opens, and remaining hydrogen bubbles are further eliminated during this period. The seal oil S flows out from the float trap tank 12 after the float valve 121 opens, and is transferred to the air detraining tank 13.

The seal oil S collected from the internal side is exposed to atmospheric pressure in the air detraining tank 13, and hydrogen gas G dissolved in the seal oil S by internal pressure is further discharged. Air bubbles mixed into the seal oil S collected from the external side are eliminated in the air detraining tank 13. The seal oil S is then sent from the air detraining tank 13 to a main oil tank.

If the float value 121 should fail in the rotating electrical machine 1 configured as described above, the communicating valves 112 and 122, seal valve 141, and vent valve 115 are closed, the bypass valve 151 and sub-bypass valve 171 are opened, and the seal oil S fed to the sealing unit 4 flows into the air detraining tank 13. At this time, the opening of the bypass valve 151 and sub-bypass valve 171 is adjusted to individually control the flow rates of two hydrogen detraining tanks 11.

In the seal oil feeding apparatus 10 provided in the rotating electrical machine 1, the hydrogen detraining tank 11, which temporarily reserves seal oil S and eliminates hydrogen bubbles mixed into seal oil S, is constructed in one body with the float trap tank 12, which prevents hydrogen gas G from flowing to the outside. Further, as the hydrogen detraining tank 11 and float trap tank 12 are connected by the U-shaped oil piping 113, even if the hydrogen detraining tank 11 is placed at the same height as the float trap tank 12, the liquid level of seal oil S in the hydrogen detraining tank 11 is held constant. For example, however a liquid surface area varies with the height of the liquid level of seal oil S in the hydrogen detraining tank 11 when an elongate cylindrical vessel is used as hydrogen detraining tanks 11 and float trap tank 12. Even in such a case, as the hydrogen detraining tanks 11 and float trap tank 12 are connected by the U-shaped oil piping 113, the liquid surface area in the hydrogen detraining tank 11 can be kept constant for eliminating hydrogen gas.

Since, two hydrogen detraining tanks 11 and one float trap tank 12 are constructed in one body and placed at a position higher than the air detraining tank 13, the liquid level of seal oil S is kept at a constant height, at which the float value 121 opens in all range of pressure, even if the internal pressure of the housing 3 of the rotating electrical machine 1 changes from atmospheric pressure to a rated pressure.

The hydrogen detraining tank 11 and float trap tank 12 are placed at the same level in the seal oil feeding apparatus 10, and these tanks are constructed in one body. Therefore the number of piping in equipment is reduced, and the apparatus is installed in a smaller space. Further, in the seal oil feeding apparatus 10, a bypass route is duplicated by providing a sub-bypass piping 17 having a sub-bypass vale 171 with a small flow rate for each bypass valve 151, when the outlet piping 14 of the float valve 121 is connected to the lower part of two hydrogen detraining tanks 11 through the bypass piping 15. Since two kinds of valve with different flow rate, such as bypass valve 151 and sub-bypass valve 171, are installed, the bypass valve 151 roughly controls the flow rate of seal oil S, and the sub-bypass valve 171 minutely controls the flow rate, thereby the flow rate of seal oil S flowing out from the hydrogen detraining tank 11 is finely controlled, even if the float valve 121 is broken.

Figure 2:
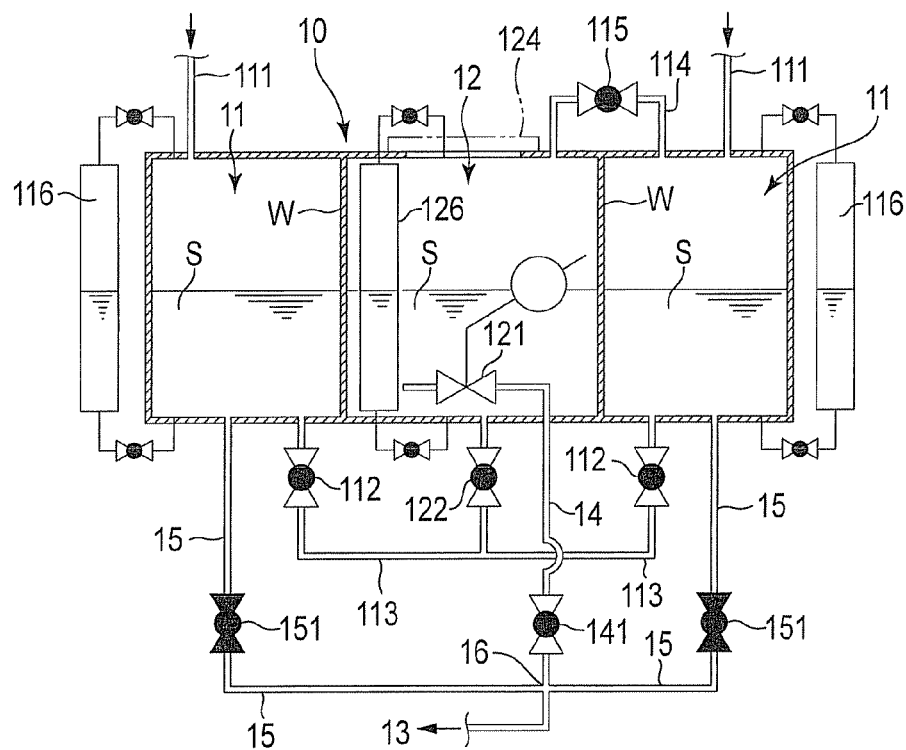
FIG. 2 is a schematic cross section of a seal oil feeding apparatus of a second embodiment.

Next, a seal oil feeding apparatus 10 of a second embodiment is explained with reference to FIG. 2. The components having the same functions as those of the seal oil feeding apparatus 10 of the first embodiment are given the same reference numbers in FIG. 2, and an explanation thereof is omitted. The description and drawing of the first embodiment are referred to when necessary.

In the seal oil feeding apparatus 10 of the second embodiment, a hydrogen detraining tank 11 and a float trap tank 12 are provided with a level gauge 116 and a level gauge 126, respectively, which indicates the liquid level of seal oil S reserved in each tank. Instead of having a sub-bypass piping for the bypass piping 15 connecting the hydrogen detraining tank 11 and outlet piping 14, a valve able to flow a large volume of fluid and to minutely control a flow rate is provided as a bypass valve 151. The other configuration is the same as that of the seal oil feeding apparatus 10 of the first embodiment.

The seal oil feeding apparatus 10 of the second embodiment configured as described above is easily checked the liquid level of seal oil S in the hydrogen detraining tank 11 and float trap tank 12 by the level gauges 116 and 126. The level gauge 126 of the float trap tank 12 only indicate the total flow rate of seal oil S flowed to the internal sides of the sealing units 4 provided at both ends of a rotor 2. However it is possible to know the flow rate of seal oil S flowed out to the internal side of the sealing unit 4 of each side, by monitoring the level gauge 116 of each hydrogen detraining tank 11. According to the monitoring results, the opening of the communicating valve 112 and other valves provided in the middle of the inside piping 111 is adjusted, and the sealing condition by the sealing unit 4 is kept satisfactory.

Further, as the level gauges 116 of the hydrogen detraining tanks 11 are individually monitored and compared, it is easy to detect a faulty sealing unit 4 in an early stage. Further, in the seal oil feeding apparatus 10 of the second embodiment, the hydrogen detraining tank 11 and flow trap tank 12 are constructed at the same height in one body, and the efficiency of checking the level gauges 116 and 126 is increased.

The seal oil feeding apparatus 10 of the second embodiment may be provided with a sub-bypass piping 17 and a sub-bypass valve 171 in addition to a bypass piping 15 and a bypass valve 151, as in the seal oil feeding apparatus 10 of the first embodiment.

Figure 3:
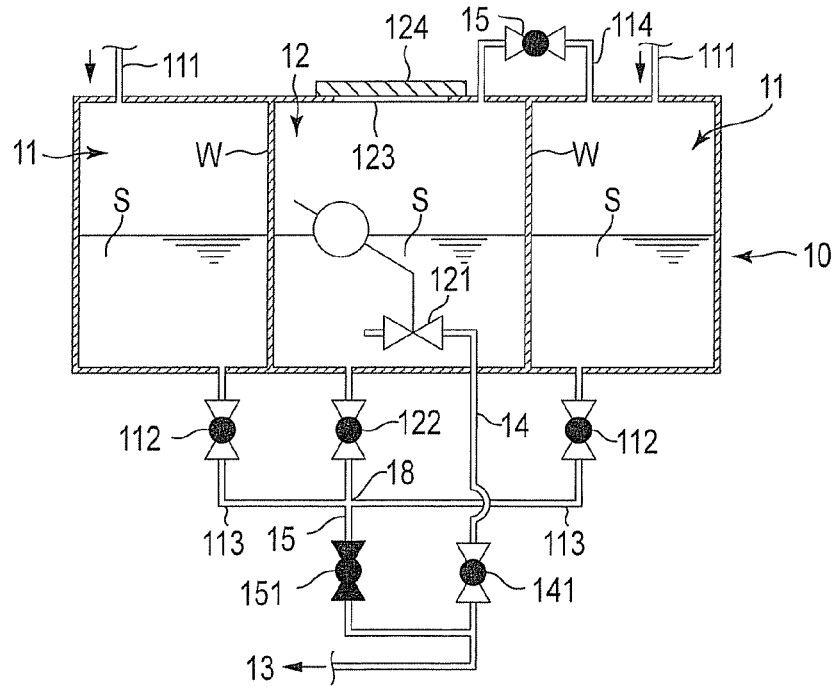
FIG. 3 is a schematic cross section of a seal oil feeding apparatus of a third embodiment.

A seal oil feeding apparatus 10 of a third embodiment is explained with reference to FIG. 3. The components having the same functions as those of the seal oil feeding apparatus 10 of the first embodiment are given the same reference numbers in FIG. 3, and an explanation thereof is omitted. The description and drawing of the first embodiment are referred to when necessary.

In the seal oil feeding apparatus 10 of the third embodiment, a bypass piping 15 and a bypass valve 151 are provided only one in a part where an oil piping 113 connected to a joint part 18 in the downstream of a communicating valve 122 is connected to the downstream of a seal valve 141 of an outlet piping 14. The other configuration is the same as that of the seal oil feeding apparatus 10 of the first embodiment, and an explanation thereof is omitted.

In the seal oil feeding apparatus 10 of the third embodiment, a communicating valve 122 and a seal valve 141 are closed, and a communicating valve 112 and a bypass valve 151 are opened, to make seal oil S flow out from a hydrogen detraining tank 11 without using an outlet piping 14. The opening of the communicating valve 112 is adjusted to control the flow rate of seal oil S flowed out from each hydrogen detraining tank 11.

According to the seal oil feeding apparatus 10 of the third embodiment, in addition to the effect of the seal oil feeding apparatus 10 of the first embodiment, a plurality of bypass piping 15 and bypass valve 151 is reduced to one. The structures of piping and valves around the hydrogen detraining tank 11 and float trap tank 12 are simplified, and thus the manufacturing cost is reduced.

A seal oil feeding apparatus 10 of a fourth embodiment is explained with reference to FIGS. 4 and 5. The components having the same functions as those of the seal oil feeding apparatus 10 of the first embodiment are given the same reference numbers in FIGS. 4 and 5, and an explanation thereof is omitted. The description and drawing of the first embodiment are referred to when necessary.

In the seal oil feeding apparatus 10 of the fourth embodiment, a float trap tank 12 is provided in a pair corresponding to a pair of hydrogen detraining tanks 11 as shown in FIG. 4. A pair of float trap tanks 12 is provided in one body between a pair of hydrogen detraining tanks 11 in the fourth embodiment. While the boundary between the float trap tanks 12 is closed by a partition wall W, the boundary between the hydrogen detraining tank 11 and float trap tank 12 is connected by a porous plate WP in both above and below the liquid level of seal oil S. In other words, a pair of hydrogen detraining tanks 11 and a pair of float trap tanks 12 are constructed as one multifunction tank separated into four compartments by the partition wall W and porous plate WP.

In the seal oil feeding apparatus 10, the liquid levels of seal oil S in the hydrogen detraining tank 11 and float trap tank 12 connected by the porous plate WP are kept at the same height. Each float valve 121 of each float trap tank 12 is opened when the liquid level of seal oil S flowed into the connected hydrogen detraining tank 11 becomes a predetermined height. Therefore, in the seal oil feeding apparatus 10 of the fourth embodiment configured as described above, communicating vales 112 and 122, an oil piping 113, a vent pipe 114, and a vent valve 115 are unnecessary, unlike in the seal oil feeding apparatus 10 of the first embodiment.

Even if a little pressure difference is generated between sealing units 4, it does not have influence upon the float trap tanks 12 which are separated by the partition wall W. A bypass piping 15 connects each hydrogen detraining tank 11 to an outlet piping 14 in the downstream of a seal valve 141. A sub-bypass piping 17 connecting the upstream and downstream of a bypass valve 151 may be additionally provided with a sub-bypass valve 171 as in the first embodiment.

A hydrogen bubble mixed into seal oil S flowed from inside piping 111 into a hydrogen detraining tank 11 rises in the hydrogen detraining tank 11, and is prevented from flowing into the float trap tank 12 by the porous plate WP. An end of the inside piping 111 contacts the inside wall separated from the float valve 121 of the float trap tank 12, and lets seal oil S flow into along the inside wall as shown in FIG. 5. In this configuration, the liquid level of seal oil S is kept a calm in the hydrogen detraining tank 11, and the operation of float valve 121 is stabilized.

The porous plate WP may be a net or a floating block as long as it permits to seal oil S to smoothly flow from the hydrogen detraining tank 11 to the float trap tank 12, and prevents spreading of a hydrogen bubble to the float trap tank. The porous plate WP may not be provided, if the liquid level is not almost disturbed when seal oil S is flowed into the float trap tank. It is easy to detect the flow rate of seal oil S, if a level gage is provided in two hydrogen detraining tanks and float trap tanks 12 as in the second embodiment.

The seal oil feeding apparatus 10 of the fourth embodiment configured as described above is different from the seal oil feeding apparatus 10 of the first embodiment in the points that the oil piping 113 in the lower part and the vent pipe 114 in the upper part of the hydrogen detraining tank 11 and float trap tank 12 are removed, one float trap tank 12 is added to correspond to each hydrogen detraining tank 11, and the partition wall W between the hydrogen detraining tank 11 and float trap tank 12 is replaced by the porous plate WP. This configuration obtains an advantage by keeping the liquid level of seal oil S the same height in the hydrogen detraining tank 11 and float trap tank 12 as in the seal oil feeding apparatus 10 of the first embodiment, and the number of pipes connected to the outside of the hydrogen detraining tank 11 and float trap tank 12 is reduced. Since the number of parts is reduced, the cost of installing the seal oil feeding apparatus 10 is reduced.

The hydrogen detraining tank 11 and float trap tank 12 in the first to fourth embodiments are provided side-by-side horizontally to each other as one vessel. However, the whole figure is not limited to those shown in FIGS. 1 to 4. The hydrogen detraining tank 11 and float trap tank 12 may be formed by dividing a vertical cylindrical vessel by a partition wall W extending in the radial direction from a centerline.

According to each embodiment explained hereinbefore, there is provided a seal oil feeding apparatus which smoothly circulates seal oil without an additional power source by simplifying a configuration maintaining functions, and a rotating electrical machine provided with the seal oil feeding apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A seal oil feeding apparatus comprising:
a hydrogen detraining tank configured to eliminate hydrogen bubbles mixed with reserve seal oil that has flown out of a sealing unit sealing between a housing and a shaft extending from both ends of a rotor;
a float trap tank structurally integrated with, and aligned horizontally in a common plane with, the hydrogen detraining tank, the float trap tank is in fluid communication with the hydrogen detraining tank such that a liquid level of the seal oil in both the float trap tank and the hydrogen detraining tank is equal;
a float valve included with the float trap tank and configured to discharge seal oil within the float trap tank when opened, the float valve is opened when the seal oil exceeds a predetermined level;
an air detraining tank configured to eliminate air bubbles mixed into the seal oil, the air detraining tank arranged vertically below, and downstream with respect to flow of seal oil, the hydrogen detraining tank and the float trap tank, and configured to reserve seal oil that has flowed out through the float valve; and
wherein the float trap tank is a first float trap tank, and the hydrogen detraining tank is a first hydrogen detraining tank, the seal oil feeding apparatus further comprising a second float trap tank and a second hydrogen detraining tank;
wherein each one of the first and second float trap tanks and the first and second hydrogen detraining tanks are structurally integrated and in a common horizontal plane; and
wherein the first float trap tank is between and directly adjacent to both the second float trap tank and the first hydrogen detraining tank, and the second float trap tank is between and directly adjacent to both the first float trap tank and the second hydrogen detraining tank.

2. The seal oil feeding apparatus of claim 1, wherein the hydrogen detraining tank is a first hydrogen detraining tank, the seal oil feeding apparatus further comprising a second hydrogen detraining tank, the float trap tank is between and structurally integrated with both the first and the second hydrogen detraining tanks.

3. The seal oil feeding apparatus of claim 2, wherein the sealing unit is a first sealing unit, the first hydrogen detraining tank is in fluid communication with the first sealing unit, and the second hydrogen detraining tank is in fluid communication with a second sealing unit at an opposite end of the rotor as the first sealing unit.

4. The seal oil feeding apparatus of claim 1, wherein a porous plate partition wall separates the float trap tank from the hydrogen detraining tank.

* * * * *